Figure 2:
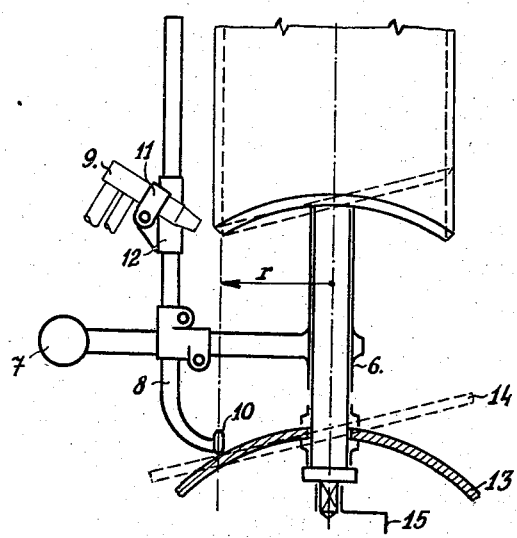

March 17, 1959     A. CINK     2,878,010
HAND APPARATUS FOR FLAME CUTTING OF PROFILED TUBE ENDS
Filed Sept. 25, 1956

INVENTOR.
Albin Cink
BY

United States Patent Office 2,878,010
Patented Mar. 17, 1959

2,878,010

HAND APPARATUS FOR FLAME CUTTING OF PROFILED TUBE ENDS

Albín Cink, Vsetin, Czechoslovakia

Application September 25, 1956, Serial No. 611,988

3 Claims. (Cl. 266—23)

The present invention relates to a hand apparatus for flame cutting of profiled tube ends.

When laying pipe lines, or in the production of vessels, branch-tubes of different diameters have often to be installed, by welding them to the main pipe line or to the vessels. For this purpose the ends of the branch tubes have to be adjusted as to their shape to fit their counterpart, and the profiled ends have also to be provided with a chamfer.

The hitherto known devices by means of which the flame cutting of the penetration curve of two pieces, to be connected, is carried out are highly intricate, heavy and cannot therefore be used in outdoor assembly work. Such devices are usually provided with laboriously milled templates or grooves for each diameter and inclination of the branch tube to be welded. The branch tubes have to be transported to such machines and must be in unbent condition. The cutting of penetration curves of two pieces outside the workshop is carried out mostly by hand in such a way that the welder marks the penetration curve on the branch tube and cuts the curve by hand. Work-shop machines produce such profiled tube ends under rotation of the branch tube.

The present invention is concerned with a simple hand apparatus for flame cutting of profiled tube ends by means of copying. The invention consists substantially in an apparatus for hand cutting by copying the penetration curve on the tube directly from the main pipe line or vessel and for this purpose the copying roller and the cutting burner are mounted for rotation and sliding movement on a rod, which is secured by an expansion fixture coaxially in the tube to be cut and serves as the axis of rotation of the said apparatus. The free end of this rod rests with its point against the counterpart in the centre of the required penetration curve. The copying of the penetration curves and cutting of the profiled tube ends may also be carried out by means of a simple template, which is secured to the free end of the rod. The template corresponds with its surface and position to the counterpart in the point of the desired penetration and may be of a cylindrical, plane, conical, spherical or the like formation.

The copying roller controlling the cutting burner at work is pressed by hand against the surface of the counterpart or template in the point of intersection of the inner surface of the tube with the surface of the counterpart in case an outer chamfer on the tube is required. For a correct weld with another chamfer it is necessary that the edge of the welded-on surface, which forms the root of the weld on the wall of the tube to be cut, should fit the counterpart. For this purpose the copying roller is placed in a distance from the axis of the rod, equal to the radius "r" of this edge.

With the hand apparatus for flame cutting of profiled tube ends according to the invention penetration curves may be cut in various working positions without rotating the branch pipe. The axis of the branch pipe may be perpendicular to the surface of the counterpart or form another angle used in practice. The apparatus according to the invention is highly universal and has a considerable working range.

Figure 1:
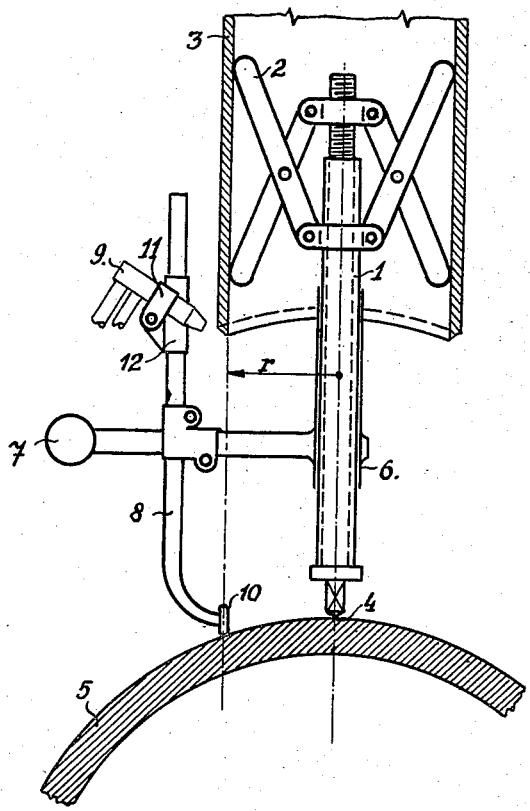

A hand apparatus for cutting profiled tube ends is represented by way of example in the accompanying drawing, wherein Fig. 1 shows a longitudinal section in the working position and Fig. 2 a modified embodiment using a sheet metal template.

The hand apparatus for flame cutting of profiled tube ends according to the invention consists of a rod 1 secured by an expansion fixture 2 in the tube 3. The rod 1 is terminated by a point 4 with which it abuts against the counterpart 5 (pipe or vessel). On the rod 1 a sleeve 6 is mounted for rotation and sliding movement, said sleeve carrying an arm 7, by means of which the welder controls the machine at work. On the said arm a holder 8 of the cutting burner 9 and a copying roller 10 are mounted. The holder 8 is slidable on the arm 7 so as to adjust the copying roller 10 to a distance "r" of the root of the weld on the wall of the tube to be cut. The cutting burner is mounted for movement in a clamp 11 of a holder 12 and may be adjusted into the desired position.

In the alternative according to Fig. 2 a cylindrical template 13 is shown in full lines and a straight template 14 in dotted lines; these templates are used when cutting profiled tube ends, when the penetration curve cannot be cut directly according to the counterpart.

The cutting of profiled tube ends is carried out so that the rod 1 with the expansion fixture 2 is inserted into the tube 3 and expanded by means of a hand crank (handle) 15 which is then removed. On the rod secured in the tube the sleeve 6 with the arm 7 and holder 8 is fitted, the holder adjusted so as to bring the copying roller 10 into the desired distance from the axis and the cutting burner 9 is adjusted to the desired cutting position. The tube with the entire apparatus is shifted against the counterpart 5 until the point 4 abuts against its surface. When the penetration curve is copied by means of the template 13, 14, the latter is secured at the free end of the rod 1. After igniting the cutting burner the welder rotates the arm 7 around the rod 1 and at the same time presses the copying roller against the counterpart or template. After revolving the arm through 360°, the entire penetration curve at the end of the tube 3 is cut out.

With the hand apparatus for flame cutting of profiled tube ends, profiled penetrations may be produced from the smallest diameters of tubes up to the largest, according to the dimensions of the apparatus. The cutting operation is convenient and quick, the cut surfaces are highly accurate for welding and the work may be performed by semi-skilled labor.

It is an advantage that the apparatus may easily be transported and may therefore be used also on outdoor assembly work.

I claim:

1. Hand operated apparatus for flame cutting a profiled end on a pipe, to correspond to a required pipe-surface-intersection curve, comprising a rod adapted to be positioned to extend coaxially with respect to the pipe and to be, at one end, releasably secured within a portion of the pipe at the end to be cut, the rod being provided on its other end with means to engage the surface corresponding to the surface to be intersected, an arm extending radially with respect to the rod, means mounting the arm on the rod and permitting the arm to rotate about and to slide along the rod, an elongated holding member extending substantially parallel to the rod, releasable clamping means mounting the holding member on the arm and permitting the holding member to rotate about its axis and to slide along the rod, the holding member being also adapted to rotate and slide together with the arm about and along the rod, the holding member having an offset portion at the end adjacent said other rod end, a follower roller carried at the free end of said offset portion, said roller being adapted to move over the surface to be intersected and being adjustable as to its positions with respect to the radial distance between the roller and the rod so that said distance can be made equal to a varying radius of the pipe to be cut, a cutting torch, and means on the holding member for holding the cutting torch so that the latter duplicates directly and cuts along a path followed by the follower roller on the surface corresponding to that to be intersected.

2. Hand operated apparatus as in claim 1; wherein said means on the other end of said rod includes a pointed member adapted to abut against the profiled surface of a part to which the cut end of the tube is to be joined so that said roller moves over the surface of the part to which the cut end of the tube is to be joined.

3. Hand operated apparatus as in claim 1; wherein said means on the other end of said rod includes securing means for mounting a shaped template on said rod having a profile surface corresponding to that of the part to which the cut end of the tube is to be joined.

References Cited in the file of this patent
UNITED STATES PATENTS

| | | |
|---|---|---|
| 2,054,925 | Bucknam et al. | Sept. 22, 1936 |
| 2,497,853 | Arnold et al. | Feb. 21, 1950 |
| 2,545,666 | Lonngren | Mar. 20, 1951 |
| 2,623,285 | Marinovich | Dec. 30, 1952 |